US008594118B2

(12) United States Patent
Cooper et al.

(10) Patent No.: US 8,594,118 B2
(45) Date of Patent: Nov. 26, 2013

(54) METHOD AND APPARATUS FOR CONFIGURING LOGICAL CHANNELS IN A NETWORK

(75) Inventors: Michael J. Cooper, Marietta, GA (US); John L. Moran, III, Uxbridge, MA (US)

(73) Assignee: General Instrument Corporation, Horsham, PA (US)

( * ) Notice: Subject to any disclaimer, the term of this patent is extended or adjusted under 35 U.S.C. 154(b) by 873 days.

(21) Appl. No.: 11/690,217

(22) Filed: Mar. 23, 2007

(65) Prior Publication Data

US 2007/0223512 A1    Sep. 27, 2007

Related U.S. Application Data

(60) Provisional application No. 60/785,647, filed on Mar. 24, 2006.

(51) Int. Cl.
*H04J 3/16* (2006.01)

(52) U.S. Cl.
USPC .................. 370/437; 370/431; 455/452.2

(58) Field of Classification Search
USPC .................. 370/431–442; 455/452.2, 450
See application file for complete search history.

(56) References Cited

U.S. PATENT DOCUMENTS

| | | |
|---|---|---|
| 3,838,221 A | 9/1974 | Schmidt et al. |
| 4,245,342 A | 1/1981 | Entenman |
| 4,385,392 A | 5/1983 | Angell et al. |
| 4,811,360 A | 3/1989 | Potter |
| 4,999,787 A | 3/1991 | McNally et al. |
| 5,228,060 A | 7/1993 | Uchiyama |
| 5,251,324 A | 10/1993 | McMullan |
| 5,271,060 A | 12/1993 | Moran et al. |
| 5,278,977 A | 1/1994 | Spencer et al. |
| 5,347,539 A | 9/1994 | Sridhar et al. |
| 5,390,339 A | 2/1995 | Bruckert et al. |
| 5,463,661 A | 10/1995 | Moran et al. |
| 5,532,865 A | 7/1996 | Utsumi et al. |

(Continued)

FOREIGN PATENT DOCUMENTS

| | | |
|---|---|---|
| DE | 69631420 T2 | 12/2004 |
| EP | 1235402 A2 | 8/2002 |

(Continued)

OTHER PUBLICATIONS

Japanese Patent Application No. 2008-557531, Notice of Reasons for Rejection, Oct. 5, 2010, 2 pages.

(Continued)

*Primary Examiner* — Phuc Tran
(74) *Attorney, Agent, or Firm* — Lori Anne D. Swanson

(57) ABSTRACT

Logical channels in a network are automatically be configured by using measured network parameters. The measured network parameters are determined in cooperation with the network elements without interruption of active communication services. The network parameters include upstream or downstream modulation error ratio (MER), upstream or downstream signal to noise ratio (SNR), upstream or downstream microreflections, upstream transmit level, downstream receive power level, cable modem type (DOCSIS 1.0,1.1,2.0), functional capabilities (e.g., VoIP, 256QAM, etc), network element location with in a cable plant (e.g., node location or amplifier cascade depth), network element manufacturer, or type of services provided by the network element (including telephony versus data). An interactive display is provided to an operator which enables analysis of communication parameters, including modulation profiles and channel performance.

16 Claims, 5 Drawing Sheets

(56) References Cited

U.S. PATENT DOCUMENTS

| | | |
|---|---|---|
| 5,557,603 A | 9/1996 | Barlett et al. |
| 5,606,725 A | 2/1997 | Hart |
| 5,631,846 A | 5/1997 | Szurkowski |
| 5,694,437 A | 12/1997 | Yang et al. |
| 5,732,104 A | 3/1998 | Brown et al. |
| 5,790,523 A | 8/1998 | Ritchie et al. |
| 5,862,451 A * | 1/1999 | Grau et al. .................... 725/116 |
| 5,867,539 A | 2/1999 | Koslov |
| 5,870,429 A | 2/1999 | Moran et al. |
| 5,886,749 A | 3/1999 | Williams et al. |
| 5,939,887 A | 8/1999 | Schmidt et al. |
| 5,943,604 A | 8/1999 | Chen et al. |
| 6,032,019 A | 2/2000 | Chen et al. |
| 6,061,393 A | 5/2000 | Tsui et al. |
| 6,108,351 A | 8/2000 | Hardy et al. |
| 6,154,503 A | 11/2000 | Strolle |
| 6,229,792 B1 | 5/2001 | Anderson et al. |
| 6,230,326 B1 | 5/2001 | Unger et al. |
| 6,233,274 B1 | 5/2001 | Tsui et al. |
| 6,240,553 B1 | 5/2001 | Son et al. |
| 6,272,150 B1 | 8/2001 | Hrastar et al. |
| 6,278,730 B1 | 8/2001 | Tsui et al. |
| 6,308,286 B1 | 10/2001 | Richmond et al. |
| 6,310,909 B1 | 10/2001 | Jones |
| 6,321,384 B1 | 11/2001 | Eldering |
| 6,330,221 B1 | 12/2001 | Gomez |
| 6,334,219 B1 | 12/2001 | Hill et al. |
| 6,377,552 B1 | 4/2002 | Moran et al. |
| 6,385,773 B1 | 5/2002 | Schwartzman et al. |
| 6,389,068 B1 | 5/2002 | Smith et al. |
| 6,434,583 B1 | 8/2002 | Dapper et al. |
| 6,445,734 B1 | 9/2002 | Chen et al. |
| 6,456,597 B1 | 9/2002 | Bare |
| 6,459,703 B1 | 10/2002 | Grimwood et al. |
| 6,477,197 B1 | 11/2002 | Unger |
| 6,480,469 B1 | 11/2002 | Moore et al. |
| 6,483,033 B1 | 11/2002 | Simoes et al. |
| 6,498,663 B1 | 12/2002 | Farhan et al. |
| 6,512,616 B1 | 1/2003 | Nishihara |
| 6,526,260 B1 | 2/2003 | Hick et al. |
| 6,546,557 B1 | 4/2003 | Ovadia |
| 6,556,239 B1 | 4/2003 | Al Araji et al. |
| 6,556,562 B1 | 4/2003 | Bhagavath et al. |
| 6,556,660 B1 | 4/2003 | Li et al. |
| 6,559,756 B2 | 5/2003 | Al Araji et al. |
| 6,563,868 B1 | 5/2003 | Zhang et al. |
| 6,570,394 B1 | 5/2003 | Williams |
| 6,570,913 B1 | 5/2003 | Chen |
| 6,574,797 B1 | 6/2003 | Naegeli et al. |
| 6,588,016 B1 | 7/2003 | Chen et al. |
| 6,606,351 B1 | 8/2003 | Dapper et al. |
| 6,611,795 B2 | 8/2003 | Cooper |
| 6,646,677 B2 | 11/2003 | Noro et al. |
| 6,662,135 B1 | 12/2003 | Burns et al. |
| 6,662,368 B1 | 12/2003 | Cloonan et al. |
| 6,671,334 B1 | 12/2003 | Kuntz et al. |
| 6,687,632 B1 | 2/2004 | Rittman |
| 6,690,655 B1 | 2/2004 | Miner et al. |
| 6,700,875 B1 | 3/2004 | Schroeder et al. |
| 6,700,927 B1 | 3/2004 | Esliger et al. |
| 6,711,134 B1 | 3/2004 | Wichelman et al. |
| 6,741,947 B1 | 5/2004 | Wichelman et al. |
| 6,748,551 B2 | 6/2004 | Furudate et al. |
| 6,757,253 B1 | 6/2004 | Cooper et al. |
| 6,772,388 B2 | 8/2004 | Cooper et al. |
| 6,772,437 B1 | 8/2004 | Cooper et al. |
| 6,816,463 B2 | 11/2004 | Cooper et al. |
| 6,839,829 B1 | 1/2005 | Daruwalla et al. |
| 6,853,932 B1 | 2/2005 | Wichelman et al. |
| 6,877,166 B1 | 4/2005 | Roeck et al. |
| 6,895,043 B1 | 5/2005 | Naegeli et al. |
| 6,895,594 B1 | 5/2005 | Simoes et al. |
| 6,906,526 B2 | 6/2005 | Hart et al. |
| 6,928,475 B2 | 8/2005 | Schenkel et al. |
| 6,944,881 B1 | 9/2005 | Vogel |
| 6,961,314 B1 | 11/2005 | Quigley et al. |
| 6,961,370 B2 | 11/2005 | Chappell |
| 6,967,994 B2 | 11/2005 | Boer et al. |
| 6,973,141 B1 | 12/2005 | Isaksen et al. |
| 6,985,437 B1 | 1/2006 | Vogel |
| 6,999,408 B1 | 2/2006 | Gomez |
| 7,002,899 B2 * | 2/2006 | Azenkot et al. ................ 370/208 |
| 7,010,002 B2 | 3/2006 | Chow et al. |
| 7,017,176 B1 | 3/2006 | Lee et al. |
| 7,032,159 B2 | 4/2006 | Lusky et al. |
| 7,039,939 B1 | 5/2006 | Millet et al. |
| 7,050,419 B2 | 5/2006 | Azenkot et al. |
| 7,054,554 B1 | 5/2006 | McNamara et al. |
| 7,058,007 B1 | 6/2006 | Daruwalla et al. |
| 7,072,365 B1 | 7/2006 | Ansley |
| 7,079,457 B2 | 7/2006 | Wakabayashi et al. |
| 7,099,412 B2 | 8/2006 | Coffey |
| 7,099,580 B1 | 8/2006 | Bulbul |
| 7,139,283 B2 | 11/2006 | Quigley et al. |
| 7,142,609 B2 | 11/2006 | Terreault et al. |
| 7,152,025 B2 | 12/2006 | Lusky et al. |
| 7,158,542 B1 | 1/2007 | Zeng et al. |
| 7,164,694 B1 | 1/2007 | Nodoushani et al. |
| 7,177,324 B1 | 2/2007 | Choudhury et al. |
| 7,197,067 B2 | 3/2007 | Lusky et al. |
| 7,222,255 B1 | 5/2007 | Claessens et al. |
| 7,227,863 B1 | 6/2007 | Leung et al. |
| 7,242,862 B2 | 7/2007 | Saunders et al. |
| 7,246,368 B1 | 7/2007 | Millet et al. |
| 7,263,123 B2 | 8/2007 | Yousef |
| 7,274,735 B2 | 9/2007 | Lusky et al. |
| 7,315,573 B2 | 1/2008 | Lusky et al. |
| 7,315,967 B2 | 1/2008 | Azenko et al. |
| 7,400,677 B2 | 7/2008 | Jones |
| 7,421,276 B2 | 9/2008 | Steer et al. |
| 7,451,472 B2 | 11/2008 | Williams |
| 7,492,703 B2 | 2/2009 | Lusky et al. |
| 7,554,902 B2 | 6/2009 | Kim et al. |
| 7,573,884 B2 | 8/2009 | Klimker et al. |
| 7,573,935 B2 | 8/2009 | Min et al. |
| 7,616,654 B2 | 11/2009 | Moran et al. |
| 7,650,112 B2 | 1/2010 | Utsumi et al. |
| 7,672,310 B2 | 3/2010 | Cooper et al. |
| 7,684,315 B1 | 3/2010 | Beser |
| 7,684,341 B2 | 3/2010 | Howald |
| 7,716,712 B2 | 5/2010 | Booth et al. |
| 7,739,359 B1 | 6/2010 | Millet et al. |
| 7,742,697 B2 | 6/2010 | Cooper et al. |
| 7,742,771 B2 | 6/2010 | Thibeault |
| 7,778,314 B2 | 8/2010 | Wajcer et al. |
| 7,787,557 B2 | 8/2010 | Kim et al. |
| 7,792,183 B2 | 9/2010 | Massey et al. |
| 7,856,049 B2 * | 12/2010 | Currivan et al. ............... 375/222 |
| 7,876,697 B2 | 1/2011 | Thompson et al. |
| 7,953,144 B2 | 5/2011 | Allen et al. |
| 7,970,010 B2 | 6/2011 | Denney et al. |
| 8,000,254 B2 | 8/2011 | Thompson et al. |
| 8,037,541 B2 | 10/2011 | Montague et al. |
| 8,040,915 B2 * | 10/2011 | Cummings ................... 370/468 |
| 8,059,546 B2 | 11/2011 | Pai et al. |
| 8,081,674 B2 | 12/2011 | Thompson et al. |
| 8,116,360 B2 | 2/2012 | Thibeault |
| 8,265,559 B2 | 9/2012 | Cooper et al. |
| 8,284,828 B2 | 10/2012 | Cooper et al. |
| 8,345,557 B2 | 1/2013 | Thibeault et al. |
| 2001/0055319 A1 | 12/2001 | Quigley et al. |
| 2002/0038461 A1 | 3/2002 | White et al. |
| 2002/0044531 A1 | 4/2002 | Cooper et al. |
| 2002/0091970 A1 | 7/2002 | Furudate et al. |
| 2002/0116493 A1 | 8/2002 | Schenkel et al. |
| 2002/0154620 A1 | 10/2002 | Azenkot et al. |
| 2002/0168131 A1 | 11/2002 | Walter et al. |
| 2002/0181395 A1 | 12/2002 | Foster et al. |
| 2003/0028898 A1 | 2/2003 | Howald |
| 2003/0043732 A1 | 3/2003 | Walton et al. |
| 2003/0067883 A1 | 4/2003 | Azenkot et al. |
| 2003/0101463 A1 | 5/2003 | Greene et al. |
| 2003/0108052 A1 | 6/2003 | Inoue et al. |
| 2003/0120819 A1 | 6/2003 | Abramson et al. |

(56) References Cited

U.S. PATENT DOCUMENTS

| | | |
|---|---|---|
| 2003/0138250 A1 | 7/2003 | Glynn |
| 2003/0149991 A1 | 8/2003 | Reidhead et al. |
| 2003/0158940 A1 | 8/2003 | Leigh |
| 2003/0179768 A1 | 9/2003 | Lusky et al. |
| 2003/0179770 A1 | 9/2003 | Reznic et al. |
| 2003/0179821 A1 | 9/2003 | Lusky et al. |
| 2003/0181185 A1 | 9/2003 | Lusky et al. |
| 2003/0182664 A1 | 9/2003 | Lusky et al. |
| 2003/0185176 A1 | 10/2003 | Lusky et al. |
| 2003/0188254 A1 | 10/2003 | Lusky et al. |
| 2003/0200317 A1 | 10/2003 | Zeitak et al. |
| 2003/0212999 A1 | 11/2003 | Cai |
| 2004/0015765 A1 | 1/2004 | Cooper et al. |
| 2004/0042385 A1 | 3/2004 | Kim et al. |
| 2004/0047284 A1 | 3/2004 | Eidson |
| 2004/0052356 A1* | 3/2004 | McKinzie et al. ....... 379/355.02 |
| 2004/0062548 A1 | 4/2004 | Obeda et al. |
| 2004/0073937 A1 | 4/2004 | Williams |
| 2004/0096216 A1 | 5/2004 | Ito |
| 2004/0109661 A1 | 6/2004 | Bierman et al. |
| 2004/0139473 A1 | 7/2004 | Greene |
| 2004/0163129 A1 | 8/2004 | Chapman et al. |
| 2004/0181811 A1 | 9/2004 | Rakib |
| 2004/0208513 A1 | 10/2004 | Peddanarappagari et al. |
| 2004/0233234 A1 | 11/2004 | Chaudhry et al. |
| 2004/0233926 A1 | 11/2004 | Cummings |
| 2004/0248520 A1 | 12/2004 | Miyoshi |
| 2004/0261119 A1 | 12/2004 | Williams et al. |
| 2005/0010958 A1 | 1/2005 | Rakib et al. |
| 2005/0025145 A1 | 2/2005 | Rakib et al. |
| 2005/0034159 A1 | 2/2005 | Ophir et al. |
| 2005/0039103 A1 | 2/2005 | Azenko et al. |
| 2005/0058082 A1 | 3/2005 | Moran et al. |
| 2005/0064890 A1 | 3/2005 | Johan et al. |
| 2005/0097617 A1 | 5/2005 | Currivan et al. |
| 2005/0108763 A1 | 5/2005 | Baran et al. |
| 2005/0122996 A1 | 6/2005 | Azenkot et al. |
| 2005/0163088 A1 | 7/2005 | Yamano et al. |
| 2005/0175080 A1 | 8/2005 | Bouillett |
| 2005/0183130 A1 | 8/2005 | Sadja et al. |
| 2005/0198688 A1 | 9/2005 | Fong |
| 2005/0226161 A1 | 10/2005 | Jaworski |
| 2005/0281200 A1 | 12/2005 | Terreault |
| 2006/0013147 A1 | 1/2006 | Terpstra et al. |
| 2006/0121946 A1 | 6/2006 | Walton et al. |
| 2006/0250967 A1 | 11/2006 | Miller et al. |
| 2006/0262722 A1 | 11/2006 | Chapman et al. |
| 2007/0002752 A1 | 1/2007 | Thibeault et al. |
| 2007/0058542 A1 | 3/2007 | Thibeault |
| 2007/0076592 A1 | 4/2007 | Thibeault et al. |
| 2007/0076789 A1 | 4/2007 | Thibeault |
| 2007/0076790 A1 | 4/2007 | Thibeault et al. |
| 2007/0086328 A1 | 4/2007 | Kao et al. |
| 2007/0094691 A1 | 4/2007 | Gazdzinski |
| 2007/0097907 A1 | 5/2007 | Cummings |
| 2007/0133672 A1 | 6/2007 | Lee et al. |
| 2007/0143654 A1 | 6/2007 | Joyce et al. |
| 2007/0147489 A1 | 6/2007 | Sun et al. |
| 2007/0177526 A1 | 8/2007 | Siripunkaw et al. |
| 2007/0184835 A1 | 8/2007 | Bitran et al. |
| 2007/0189770 A1 | 8/2007 | Sucharczuk et al. |
| 2007/0206600 A1 | 9/2007 | Klimker et al. |
| 2007/0206625 A1 | 9/2007 | Maeda |
| 2007/0211618 A1 | 9/2007 | Cooper et al. |
| 2007/0223920 A1 | 9/2007 | Moore et al. |
| 2007/0245177 A1 | 10/2007 | Cooper et al. |
| 2008/0056713 A1 | 3/2008 | Cooper et al. |
| 2008/0062888 A1 | 3/2008 | Lusky et al. |
| 2008/0075157 A1 | 3/2008 | Allen et al. |
| 2008/0101210 A1 | 5/2008 | Thompson et al. |
| 2008/0140823 A1 | 6/2008 | Thompson et al. |
| 2008/0193137 A1 | 8/2008 | Thompson et al. |
| 2008/0200129 A1 | 8/2008 | Cooper et al. |
| 2008/0242339 A1 | 10/2008 | Anderson |
| 2008/0250508 A1 | 10/2008 | Montague et al. |
| 2008/0274700 A1 | 11/2008 | Li |
| 2008/0291840 A1 | 11/2008 | Cooper et al. |
| 2009/0031384 A1 | 1/2009 | Brooks et al. |
| 2009/0103557 A1 | 4/2009 | Hong et al. |
| 2009/0103669 A1 | 4/2009 | Kolze et al. |
| 2009/0249421 A1 | 10/2009 | Liu et al. |
| 2010/0083356 A1 | 4/2010 | Steckley et al. |
| 2010/0095360 A1 | 4/2010 | Pavlovski et al. |
| 2010/0154017 A1 | 6/2010 | An et al. |
| 2010/0157824 A1 | 6/2010 | Thompson et al. |
| 2010/0158093 A1 | 6/2010 | Thompson et al. |
| 2010/0223650 A1 | 9/2010 | Millet et al. |
| 2011/0026577 A1 | 2/2011 | Primo et al. |
| 2011/0030019 A1 | 2/2011 | Ulm et al. |
| 2011/0069745 A1 | 3/2011 | Thompson et al. |
| 2011/0110415 A1 | 5/2011 | Cooper et al. |
| 2011/0194418 A1 | 8/2011 | Wolcott et al. |
| 2011/0194597 A1 | 8/2011 | Wolcott et al. |
| 2011/0197071 A1 | 8/2011 | Wolcott et al. |
| 2011/0243214 A1 | 10/2011 | Wolcott et al. |
| 2012/0054312 A1 | 3/2012 | Salinger |
| 2012/0084416 A1 | 4/2012 | Thibeault et al. |
| 2012/0147751 A1 | 6/2012 | Ulm |

FOREIGN PATENT DOCUMENTS

| | | |
|---|---|---|
| EP | 1341335 A2 | 9/2003 |
| JP | 55132161 A | 10/1980 |
| JP | 04208707 A | 7/1992 |
| JP | 6120896 A | 4/1994 |
| JP | 6177840 A | 6/1994 |
| JP | 09008738 A | 1/1997 |
| JP | 9162816 A | 6/1997 |
| JP | 10247893 A | 9/1998 |
| JP | 11230857 A | 8/1999 |
| JP | 2001-44956 A | 2/2001 |
| JP | 2003530761 A | 10/2003 |
| JP | 2004172783 A | 6/2004 |
| JP | 2004343678 A | 12/2004 |
| WO | 0192901 A1 | 6/2001 |
| WO | 0233974 A1 | 4/2002 |
| WO | 2004062124 A1 | 7/2004 |
| WO | 2009146426 A1 | 12/2009 |

OTHER PUBLICATIONS

PCT Search Report and Written Opinion for PCT/US2007/64759, mailed Dec. 20, 2007.

Office Action, Korean App. No. 10-2008-7023199 (Foreign Text), Apr. 30, 2010.

Office Action, Korean App. No. 10-2008-7023199 (English Translation), May 20, 2010.

Extended European Search Report for European Patent Application No. EP07759225, dated Jun. 25, 2012.

Canadian Office Action for Canadian Patent Application No. 2,646,281, dated May 16, 2012.

"A Simple Algorithm for Fault Localization Using Naming Convention and Micro-reflection Signature," Invention Disclosure 60193, Cable Television Laboratories, Inc., Jun. 2008, p. 2.

"Data-Over-Cable Service Interface Specifications DOCSIS 3.0: MAC and Upper Layer Protocols Interface," CM-SP-MULPIv3.0-116-110623, Cable Television Laboratories, Inc., Jun. 2011, section 8, pp. 242-266.

"Data-Over-Cable Service Interface Specifications DOCSIS® 3.0—MAC and Upper Layer Protocols Interface Specification," CM-SP-MULPIv3.0-117-111117, Cable Television Laboratories, Inc., Nov. 17, 2011, pp. 770.

"DOCSIS Best Practices and Guidelines; Proactive Network Maintenance Using Pre-Equalization," CM-GL-PNMP-V01-100415, Cable Television Laboratories, Inc., pp. 123.

"Pre-Equalization Based Pro-active Network Maintenance Process Model for CMs Transmitting on Multiple Upstream Channels," Invention Disclosure 60203, Cable Television Laboratories, Inc., May 2009, pp. 2.

"Pre-Equalization based pro-active network maintenance process model," Invention Disclosure 60177, Cable Television Laboratories, Inc., Jun. 2008, pp. 2.

(56) References Cited

OTHER PUBLICATIONS

"Proactive Network Maintenance Using Pre-Equalization," DOCSIS Best Practices and Guidelines, Cable Television Laboratories, Inc., CM-GL-PNMP-V02-110623, Jun. 23, 2011, pp. 133.
"Radio Frequency Interface Specification," Cable Television Laboratories, Inc., Data-Over-Cable Service Interface Specifications DOCSIS 2.0, CM-SP-RFIv2.0-106-040804, pp. 524, Aug. 4, 2004.
Campos, L. A., et al., "Pre-equalization based Pro-active Network Maintenance Methodology," Cable Television Laboratories, Inc., (presentation), 2012, pp. 32.
Howald, R. L., et al., "Customized Broadband—Analysis Techniques for Blended Multiplexes," pp. 12, 2002.
Howald, R., "Access Networks Solutions: Introduction to S-CDMA," Presentation to Society of Cable Telecommunications Engineers (SCTE) South Florida Chapter, Motorola, Inc., 2009, pp. 15.
Howald, R., "Upstream Snapshots & Indicators (2009)," Regional Samples, Presentation to Society of Cable Telecommunications Engineers (SCTE) South Florida Chapter, Jan. 2010, pp. 22.
Howald, R., et al., "Characterizing and Aligning the Hfc Return Path for Successful DOCSIS 3.0 Rollouts," Society of Cable Telecommunications Engineers (SCTE) Cable Tee Expo, Oct. 2009, pp. 66.
Howald, R., et al., "Docsis 3.0 Upstream: Readiness & Qualification," pp. 17, Oct. 2009.
Howald, R., et al., "The Grown-Up Potential of a Teenage Phy," pp. 65, May 2012.
Howald, R., "DOCSIS 3.0 Upstream: Technology, RF Variables & Case Studies," Access Networks Solutions, 2009, presentation to Society of Cable Telecommunications Engineers (SCTE) South Florida Chapter, Jan. 2010, pp. 23.
Hranac, R., "Linear Distortions, Part 1," Communication Technology, Jul. 1, 2005, accessed at www.cable360.net/print/ct/operations/testing/15131.html, pp. 6.
Liu, X., and Bernstein, A., "Variable Bit Rate Video Services in DOCSIS 3.0 Networks," NCTA Technical Papers, 2008, pp. 12.
Motorola., "White Paper: Expanding Bandwidth Using Advanced Spectrum Management," Sep. 25, 2003, pp. 12.
Newton's Telecom Dictionary, Sep. 1995, Flatiron Publishing, 9th Edition, pp. 216 and 1023, definitions of "carrier to noise ratio" and "signal to noise ratio".
Patrick, M., and Joyce, G., "Delivering Economical IP Video over DOCSIS by Bypassing the M-CMTS with DIBA," SCTE 2007 Emerging Technologies, Topic Subject: Service Velocity & Next Generation Architectures: How Do We Get There?, 2007, pp. 17.
Popper, A., et al, "An Advanced Receiver with Interference Cancellation for Broadband Cable Networks," Juniper Networks, International Zurich Seminar on Broadband Communications Access 2002, pp. 23-1-23-6.
Popper, A., et al, "Ingress Noise Cancellation for the Upstream Channel in Broadband Cable Access Systems," Juniper Networks, IEEE International Conference on Communications 2002, vol. 3, pp. 1808-1812.
Qureshi, S. U. H., "Adaptive Equalization," IEEE, Volume. 73, No. 9, Sep. 1985, pp. 1349-1387.
Ramakrishnan, S., "Scaling the DOCSIS Network for IPTV," Cisco Systems, Inc., SCTE Conference on Emerging Technologies and the NCTA Cable Show, 2009, pp. 19.
Shelke, Y. R., "Knowledge Based Topology Discovery and Geo-localization," Thesis, 2010, pp. 173.
Thompson, R., et al., "256-QAM for Upstream HFC," Spring Technical Forum Proceedings, 2010, pp. 142-152.
Thompson, R., et al., "256-QAM for Upstream HFD Part Two," SCTE Cable Tec Expo 2011, Technical Paper, pp. 22.
Thompson, R., et al., "Multiple Access Made Easy," SCTE Cable Tec Expo 2011, Technical Paper, pp. 23.
Thompson, R., et al., "Optimizing Upstream Throughput Using Equalization Coefficient Analysis," National Cable & Telecommunications Association (NCTA) Technical Papers, Apr. 2009, pp. 35.
Thompson, R., et al., "Practical Considerations for Migrating the Network Toward All-Digital," Society of Cable Telecommunications Engineers (SCTE) Cable-Tec Expo, Oct. 2009, pp. 22.
Thompson, R., et al., "64-QAM, 6.4MHz Upstream Deployment Challenges," SCTE Canadian Summit, Toronto, Canada, Technical Paper, Mar. 2011, pp. 25.
Volpe, B., and Miller, W., "Cable-Tec Expo 2011: Advanced Troubleshooting in a DOCSIS© 3.0 Plant," Nov. 14-17, 2011, pp. 17.
Wolcott, L., "Modem Signal Usage and Fault Isolation," U.S. Appl. No. 61/301,835, filed Feb. 5, 2010.
Zhao, F., et al., "Techniques for minimizing error propagation in decision feedback detectors for recording channels," IEEE Transactions on Magnetics, vol. 37, No. 1, Jan. 2001, pp. 12.

\* cited by examiner

METHOD AND APPARATUS FOR CONFIGURING LOGICAL CHANNELS IN A NETWORK

This application claims the benefit of U.S. Provisional Application 60/785,647 filed on Mar. 24, 2006, herein incorporated by reference in its entirety.

FIELD OF THE INVENTION

This disclosure is directed toward configuring logical channels in a network. More particularly, this disclosure is directed toward grouping network elements according to certain parameters to configure logical channels in a network.

BACKGROUND OF THE INVENTION

Coaxial cable television systems have been in widespread use for many years and extensive networks have been developed. The extensive and complex networks are often difficult for a cable operator to manage and monitor. A typical cable network generally contains a headend which includes a cable modem termination system (CMTS). The CMTS contains several receivers, each receiver connects to one or more nodes which are connected to network elements (cable modems, MTAs, etc) of many subscribers, e.g., a single receiver may be connected to hundreds of modems which vary widely in communication characteristics. In many instances several nodes may serve a particular area of a town or city. The CMTS is also usually connected to an IP network from which it obtains content from various sources including the internet, and voice networks. The network elements communicate to the CMTS via upstream communications on a dedicated band of frequency and receive information from the CMTS via downstream communications.

Cable networks are also increasingly carrying signals which require a high quality and reliability of service, such as voice communications or Voice over IP (VoIP) communications. Any disruption of voice or data traffic is a great inconvenience and often unacceptable to a subscriber.

Logical channel operation is a mechanism whereby multiple upstream channels may be configured with different operating parameters while all operating on the same physical channel. DOCSIS 2.0 introduced this concept to support simultaneous operation and therefore backwards compatibility of TDMA, ATDMA, and SCDMA cable modems.

Existing technologies within CMTSs or network management applications do not currently provide a mechanism to differentiate modems and reassigned them to leverage any grouping benefits. If such a technology did exist, it will be limited to physical channel (not logical channel) isolation and therefore would not offer much in the way of benefits as the number of physical channels is a very limited commodity. It is only with the recent creation of logical channels in the DOCSIS 2.0 specification that such benefits have manifested themselves. Current CMTS implementations for configuring logical channels are manual processes where a unique command must generally be entered for each cable modem registered on the system. With a CMTS typically servicing over 20,000 cable modems, clearly no operators are utilizing any such feature. Further, there is no current product offering that provides the operator a mechanism for grouping these modems.

SUMMARY OF THE INVENTION

This disclosure explains an automated process to determine logical channels using network elements (such as MTAs or cable modems) in conjunction with measurements made at the headend, via a CMTS device, and does not require rolling trucks to remote locations within a plant.

In accordance with principles of the invention, an apparatus of the invention may comprise: a microprocessor configured to determine network parameters associated with a selected network element based on communications with the selected network element; and a receiver configured to receive signals indicative of the network parameters from a network element, wherein the microprocessor is configured to assign the network element to a logical channel based on the network parameters. The network parameters may include one of: upstream or downstream modulation error ratio (MER), upstream or downstream signal to noise ratio (SNR), upstream or downstream microreflections, upstream transmit level, downstream receive power level, cable modem type (DOCSIS 1.0,1.1,2.0), functional capabilities (e.g., VoIP, 256QAM, etc), network element location with in a cable plant, network element manufacturer, or type of services provided by the network element (including telephony versus data). The microprocessor compares the network parameters with threshold values and assigns the network elements to a logical channel based on the comparison.

In accordance with the invention, a method for configuring logical channels in a network may comprise the steps of: determining network parameters associated with a selected network element based on communications with the selected network element; analyzing the network parameters; and assigning network elements to logical channels based on the network parameters. The step of providing instructions to the network elements to realign includes receiving instructions from an operator to realign the network elements. The step of assigning network elements to a logical channel may include an operator providing selected network elements to be assigned or unassigned to or from a logical channel.

In accordance with the principles of the invention, a computer readable medium may carrying instructions for a computer to perform a method for configuring logical channels in a network comprising the steps of: determining network parameters associated with a selected network element based on communications with the selected network element; analyzing the network parameters; and assigning network elements to logical channels based on the network parameters.

The invention enables a network operator to optimize the performance of the network by assigning network elements to logical channels cheaply and quickly at a central location, such as the headened such as by using the Motorola BSR64000, thus increasing the overall through-put achievable on the network and therefore the number of devices which may be serviced within a single upstream channel, without necessitating the upgrading of a cable plant of the upgrading of cable modem or MTA devices. The invention also enables the optimal configuration to be determined and implemented without impacting active services. All measurements may be made through the use of the existing terminal network element devices (specifically, DOCSIS terminal devices such as MTAs and cable modems) as well as headend equipment (specifically a DOCSIS CMTS).

BRIEF DESCRIPTION OF THE DRAWINGS

The following drawings serve to illustrate the principles of the invention.

DETAILED DESCRIPTION OF THE INVENTION

This disclosure provides for a CMTS supporting application (PC Application) and a process which allows the network operator to easily group network elements (e.g. cable modems, media terminal adaptor (MTA) and other customer premise equipment) based upon common parametrics and performance similarities. These groupings may then be used to configure logical channels and subsequently the assignment of the network elements to these logical channels. Such grouping by logical channels provides the operator with many advantages including: the ability to take advantage of unique features common to only a subset of the network elements, increase overall network through-put by optimizing physical layer configuration parameters to network elements grouping, isolation of problematic network elements supporting proactive network maintenance activities, and differentiation by QOS which allows the operator to offer additional premium services.

This disclosure documents an apparatus and methodology for a PC application that connects to a DOCSIS CMTS and extracts the necessary information to allow the network operator to visualize various parametric relationships for all the registered network elements. The network operator may differentiate groups of these network elements based upon thresholds for these parameters, configure the CMTS with the appropriate logical channels matching these groups, and finally, automatically move each of the modems to the appropriate logical channel.

This disclosure provides for isolating network elements based upon many different parameters (upstream or downstream modulation error ratio (MER), upstream or downstream signal to noise ratio (SNR), upstream or downstream microreflections, upstream transmit level, downstream receive power level, cable modem type (DOCSIS 1.0,1.1, 2.0), functional capabilities (e.g., VoIP, 256QAM, etc), network element location with in a cable plant, network element manufacturer, or type of services provided by the network element (including telephony versus data, etc.). The network operator is given the flexibility to exploit these differences to optimize management of the network including configuring logical channels. For example, the operator can differentiate cable modems by upstream Modulation Error Ratio (MER) which is a primary determinant in the modulation rate (QPSK, 16QAM, 32QAM, 64QAM, etc) that may be run, and then set up multiple logical channels, each one with a different modulation rate, and then assign the appropriate network elements to each logical channel based upon which modulation could be supported.

Figure 1:
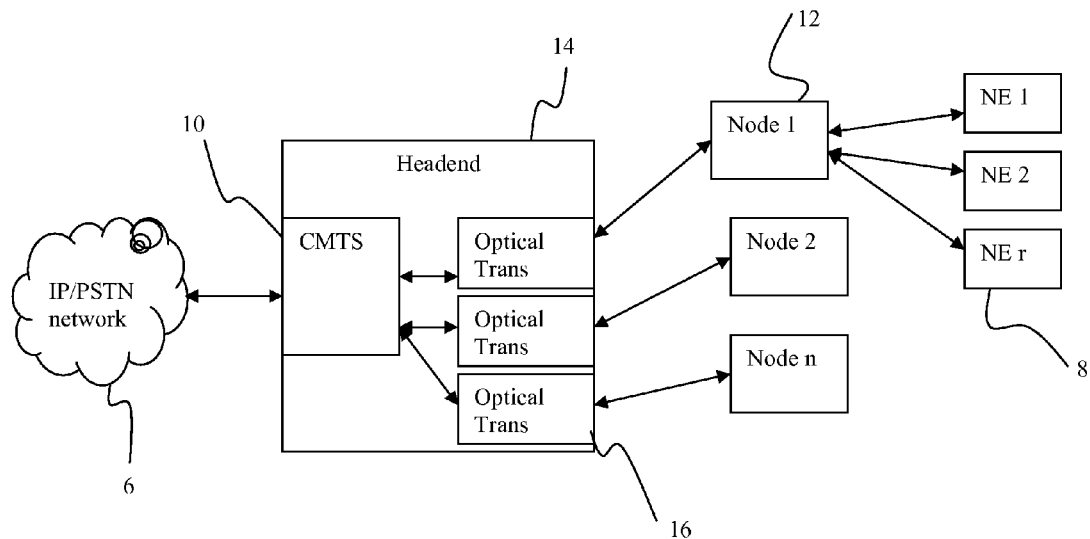
FIG. 1 illustrates an exemplary network in accordance with the principles of the invention.

FIG. 1 illustrates an exemplary network in which a plurality of terminal network elements 8 (e.g. cable modems, set top boxes, televisions equipped with set top boxes, or any other element on a network such as an HFC network) are connected to a cable modem termination system (CMTS) 10 located in a headend 14 through nodes 12 and one or more taps (not shown). In an exemplary arrangement, headend 14 also contains an optical transceiver 16 which provides optical communications through an optical fiber to the plurality of nodes 12. The CMTS 10 connects to an IP or PSTN network 6. Those of skill in the art will appreciate that there may be a plurality of nodes 12 connected to a headend, and a headend may contain a plurality of CMTS 10 units, each of which contain a plurality of receivers (e.g. 8 receivers) each of which communicate with a plurality (e.g. 100 s) of network elements 8. The CMTS 10 may also contain a spare receiver which is not continuously configured to network elements 8, but may be selectively configured to network elements 8. Use of a spare receiver is described in commonly assigned U.S. Ser. No. 11/171,066, filed on Jun. 30, 2005 and titled AUTOMATED MONITORING OF A NETWORK, herein incorporated by reference in its entirety.

Figure 2:
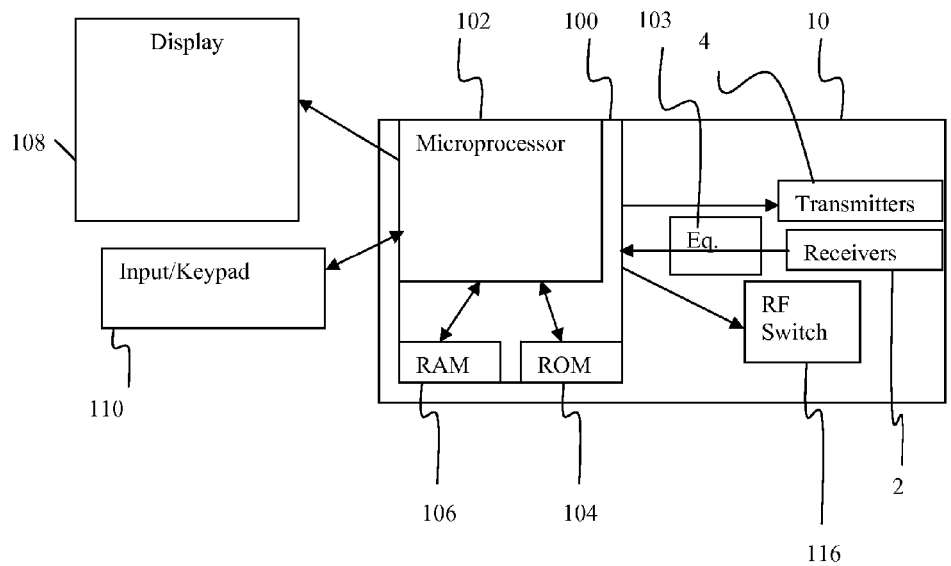
FIG. 2 illustrates a logical architecture of an exemplary CMTS 10 to facilitate an understanding of the invention.

FIG. 2 illustrates a logical architecture of an exemplary CMTS 10 to facilitate an understanding of the invention. As illustrated in FIG. 2, CMTS 10 may contain a processing unit 100 which may access a RAM 106 and a ROM 104, and may control the operation of the CMTS 10 and RF communication signals to be sent/received to/from the network elements 8. Processing unit 100 preferably contains a microprocessor 102 which may receive information, such as instructions and data, from a ROM 104 or RAM 106. Processing unit 100 is preferably connected to a display 108, such as a CRT or LCD display, which may display status information such as whether a station maintenance (SM) is being performed or a receiver is in need of load balancing. An input keypad 110 may also be connected to processing unit 100 and may allow an operator to provide instructions, processing requests and/ or data to processor 100.

RF transceiver (transmitter/receiver) unit preferably contains a plurality of transmitters 4 and receivers 2 to provide bi-directional communication with a plurality of network elements 8 through optical transceivers 16, nodes 12 and a plurality of network taps (not shown). Those of skill in the art will appreciate that CMTS 10 may contain a plurality of RF receivers 2, e.g. 8 RF receivers and a spare RF receiver. Each RF receiver 2 may support over 100 network elements. The RF receiver 2, such as a Broadcom 3140 receiver (receiver), preferably provides the received RF signals to an equalizer 103 which is used to acquire equalizer values and burst modulation error ratio (MER) measurements, packet error rate (PER) and bit error rate (BER). Equalizer 103 is preferably a multiple tap linear equalizer (e.g. a 24 tap linear equalizer), which also may be known as a feed forward equalizer (FFE). Equalizer 103 may be integrally contained in RF receiver 2 or may be a separate device. The communication characteristics of each receiver 2 may be stored on ROM 104 or RAM 106, or may be provided from an external source, such as headend 14. RAM 104 and/or ROM 106 may also carry instructions for microprocessor 102.

Figure 3:
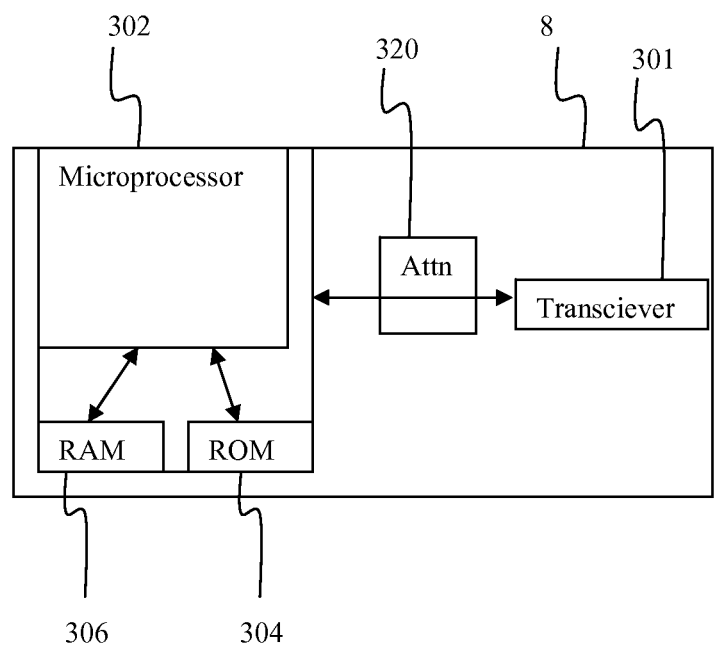
FIG. 3 illustrates an exemplary network element 8, such as a cable modem.

FIG. 3 illustrates an exemplary network element 8, such as a cable modem. Network element 8 preferably contains a processor 302 which may communicate with a RAM 306 and ROM 304, and which controls the general operation of the network element, including the pre-equalization parameters and preamble lengths of communications sent by the network element in accordance with instructions from the CMTS 10. Network element 8 also contains a transceiver (which includes a transmitter and receiver) which provides bidirectional RF communication with CMTS 10. Network element 8 may also contain an equalizer unit which may equalize the communications to CMTS 10. Network element 8 may also contain an attenuator 320 which may be controlled by microprocessor to attenuate signals to be transmitted to be within a desired power level. Those of skill in the art will appreciate that the components of network element 8 have been illustrated separately only for discussion purposes and that various components may be combined in practice.

Figure 4:
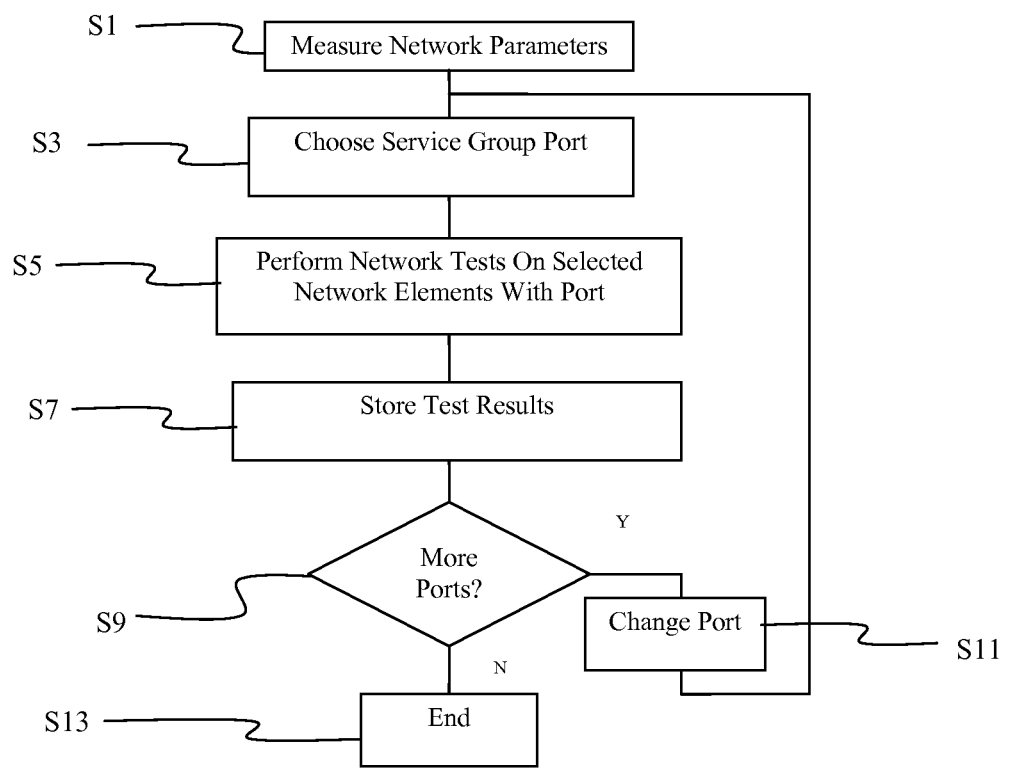
FIG. 4 illustrates an exemplary process for measuring network parameters in accordance with the principles of the present invention.

An exemplary process for automatically measuring network element parameters in a service group, which may be associated with a node, is illustrated in FIG. 4. As illustrated in step S1 of FIG. 4, the measurement process is initiated and service group port is chosen, step S3.

As illustrated in FIG. 4, step S3, a service group port, e.g. a receiver on the headend, is chosen for testing. The network elements associated with the selected service group port are tested, step S5. The tests performed may include: upstream or downstream modulation error ratio (MER), upstream or downstream signal to noise ratio (SNR), upstream or downstream microreflections, upstream transmit level, downstream receive power level, cable modem type (DOCSIS 1.0,1.1,2.0), functional capabilities (e.g., VoIP, 256QAM, etc), network element location with in a cable plant, network element manufacturer, or type of services provided by the network element (including telephony versus data, etc.

While any suitable technique for determining the location of a network element in the cable network may be used, a methodology for isolating devices which reside on the same optical node or serving group is provided in a commonly assigned disclosure entitled METHOD AND APPARATUS FOR GROUPING TERMINAL NETWORK DEVICES filed on Sep. 5, 2006 and assigned U.S. Ser. No. 11/470,034, herein incorporated by reference in its entirety. Further, while any suitable technique for identifying microreflections associated with network elements may be used, a methodology for determining microreflections is provided in commonly assigned disclosure entitled METHOD AND APPARATUS FOR DETERMINING MICROREFLECTIONS IN A NETWORK, filed on Dec. 7, 2006 and assigned U.S. Ser. No. 11/608,028, herein incorporated by reference in its entirety.

The test results associated with each tested network element on the selected port are preferably stored, step S7. The process determines if more ports are available for testing, and if so, step S9, Yes, changes to another port, step S11, and performs testing on network elements associated with the new port. If no more ports are available for testing, step S9, No, then the process ends, step S13.

Figure 5:
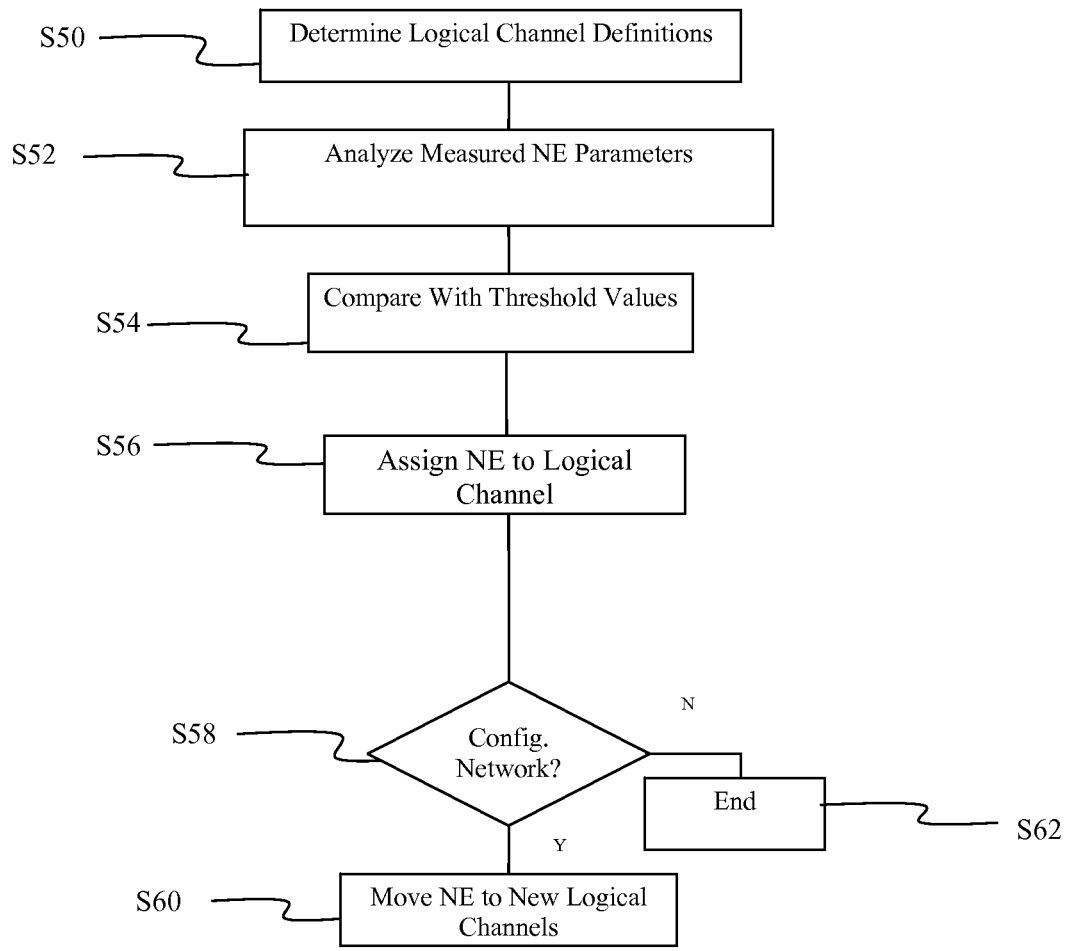
FIG. 5 illustrates an exemplary process for reconfiguring logical channels in accordance with the principles of the present invention.

FIG. 5 illustrates an exemplary process for reassigning network elements to logical channels in the network. As illustrated in step S50, the process begins by determining the logical channel definitions. This process may be implemented as an automated process whereby the processor determines which parameter to optimize and selects the optimal grouping of modems to be assigned to each of multiple logical channels. From this optimization process, the processor is able to determine the optimal value for thresholds to isolate the various logical channels and the associated channel profile configuration (parameters) for each logical channel. Alternately, the operator may be allowed to select which parameter to optimize and the desired threshold to isolate each logical channel. The measured network element parameters from the process illustrated in FIG. 4 are analyzed in step S52. The measured network parameters may be compared to one or more threshold values for each of the measurement parameters, as illustrated in step S54. The threshold values may be predetermined values or may be dynamically determined based on mathematical techniques such as a mean value of a measured network parameter, or a range of values set by an operator. The network parameters may be sorted in table and displayed in graphical formats, including bar graphs. Various techniques for analyzing the measured network parameters are displayed in an exemplary panel display from a computer operation illustrated in FIG. 6.

As illustrated in FIG. 5, step S56, the network elements are assigned to logical channels based on the comparison of their individual test parameter value with the threshold values in step S54. The process then determines if the operator desires to reconfigure the network to reassign the network elements to the newly determined logical channels, step S58. If the network operator instructs to reconfigure the network, step S58 Yes, then the network elements are moved to the logical channels to which they are designated, step S60. If the network operator does not desire to reassign the network elements to the logical channels, step S58 No, then the process ends. The process preferably uses the UCC or DCC commands as necessary to move the modems to their corresponding logical channels.

Figure 6:
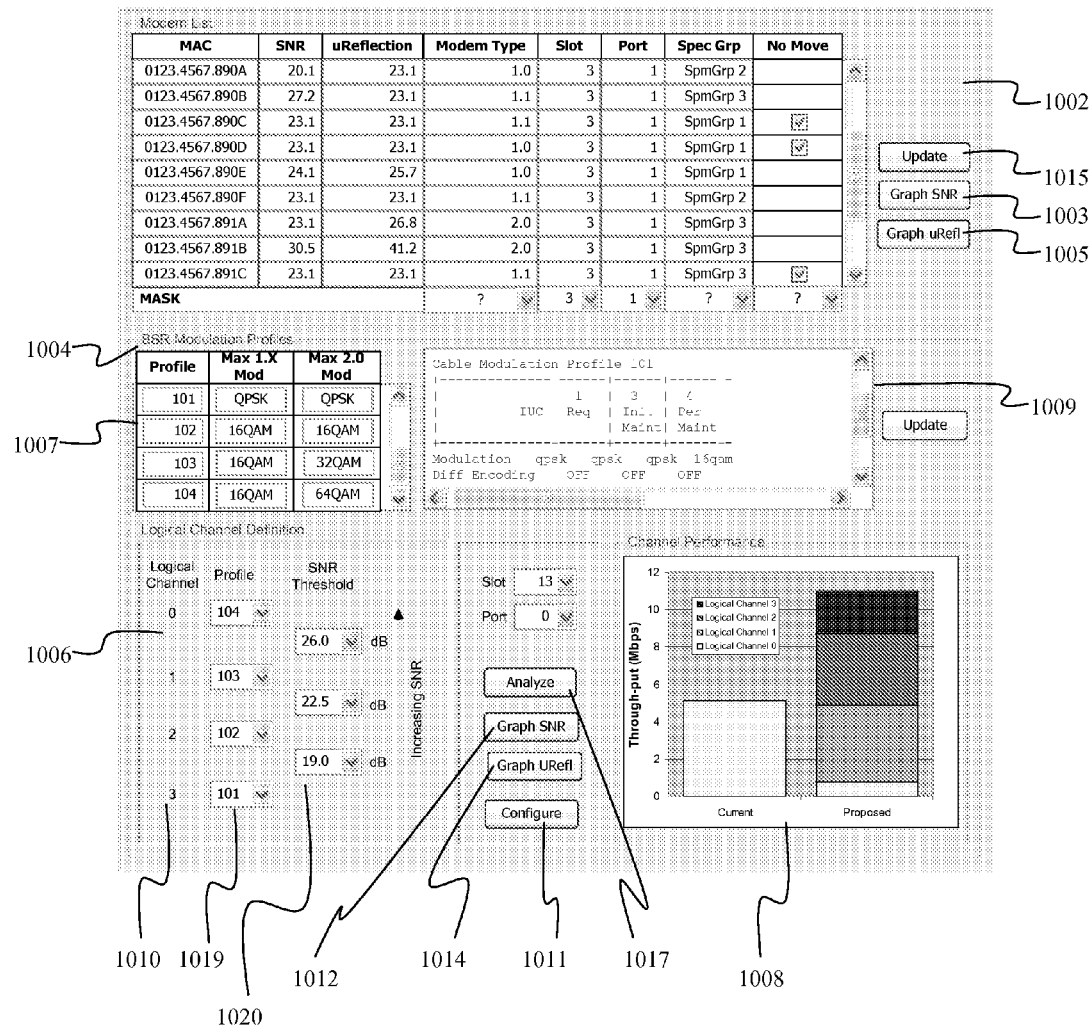
FIG. 6 illustrates an exemplary panel display from a computer operation associated with the invention.

FIG. 6 illustrates an example of a channel configuration screen shot which may be used by an operator to configure logical channels. As illustrated in FIG. 6 a three panel window may be used to display 1) a sorting of network element by various parameters 1002, 2) profile/channel parameter definitions 1004, and 3) logical channel definition/performance display 1006.

The channel configuration window preferably includes a network element list panel 1002 which displays a list of network elements on the CMTS. The operator preferably is able to sort, filter and graph the various network element parameters. While the network element parameters illustrated include the MAC address, the measured SNR and microreflections, the network element or modem type, the CMTS slot, the CMTS port, the spectrum group of the network element, and a "no move" flag, those of skill in the art will appreciate that other network element parameters may be displayed as well. By supporting sorting, filtering, and graphing, the operator is able to quickly visualize the distribution of network elements by various network element parameters and to understand the distribution of modems against various parameter thresholds. For example, the operator may quickly decipher what proportion of the modems (e.g., 75%) possess a network element parameter greater than THRESHOLD1 and less than THRESHOLD2. This understanding is useful in allowing the operator to identify which parameters should be utilized as a basis for grouping network elements into various logical channels and as a basis to select necessary thresholds. The thresholds and the number of thresholds used may also be automatically assigned to best fit the network elements into logical channels based on a network parameter, such as evenly segmenting the network elements based on SNR or microreflection.

The Logical Channel performance display 1002 may also contain various radio buttons to allow an operator to provide several graphical displays, such as Update button 1015, Graph SNR button 1003, and Graph uRefl button 1005. The Update button 1015 may extract information from the CMTS which may include the measured network element parameters. The Graph SNR button 1015 may provide a display, such as a bar chart display, of the SNR associated with network elements on the CMTS or just a designated slot or port on the CMTS. The Graph uRefl button 1005 may provide a display, such as a bar chart display, of the microreflections associated with network elements on the CMTS or just a designated slot or port. Those of skill in the art will appreciate that other radio buttons may be provided which enable display of any of the parameters associated with network elements on the CMTS or on a designated slot or port.

Various graphics displays may be provided, such as a display of upstream or downstream modulation error ratio (MER), upstream or downstream signal to noise ratio (SNR), upstream or downstream microreflections, upstream transmit level, downstream receive power level, cable modem type (DOCSIS 1.0,1.1,2.0), functional capabilities (e.g., VoIP, 256QAM, etc), network element location with in a cable plant, network element manufacturer, or type of services provided by the network element (including telephony versus data, etc.).

The Modulation Profile display panel 1004 provides the ability for the operator to configure various profile configuration templates which may later be assigned to an individual logical channel. That is, the operator may view, create and edit modulation profiles 1007 which optimize the specific needs of a subset of the network elements. Additional details of a modulation profile may be displayed as well in an expanded detail window 1009.

The Logical Channel Definition display panel 1006 provides the ability to define each logical channel 1010 for a given CMTS slot/port and select the modulations profiles 1019 viewed in the channel profile/parameter definition panel and associated with various performance parameters and thresholds 1020. Performance parameters 1020 could include: 1) upstream or downstream modulation error ratio (MER), 2) upstream or downstream signal to noise ratio (SNR), 3) upstream or downstream microreflections, 4) upstream transmit level, 5) downstream receive power level, 6) cable modem type (DOCSIS 1.0,1.1,2.0), 7) functional capabilities (e.g., VoIP, 256QAM, etc), 8) network element location with in a cable plant (e.g., node location or amplifier cascade depth), 9) network element manufacturer, 10) type of services provided by the network element (including telephony versus data, and others). A threshold (appropriate to the network element parameter selected) is preferably specified for each logical channel to allow the application to isolate (or group) the various network elements into logical channels based upon the threshold.

Logical Channel performance display 1008 may contain a bar chart 1008 (e.g. within the logical channel definition panel) which compares the theoretical performance of the channel as currently configured with the performance achieved if the logical channel configuration were implemented. This bar chart may be a color coded stacked bar which allows the operator to visualize the contributions to resulting from each of the logical channels. The Logical Channel performance display 1008 may also contain various radio buttons to an allow an operator to provide several graphical displays, such as Analyze button 1017, Graph SNR button 1012, Graph URefl button 1014, and Configure button 1011. The Graph SNR button 1012 may provide a display, such as a bar chart display, of the SNR associated with network elements on a designated slot or port. The Graph URefl button 1014 may provide a display, such as a bar chart display, of the microreflections associated with network elements on a designated slot or port. Those of skill in the art will appreciate that other radio buttons may be provided which enable display of any of the parameters associated with network elements on a designated slot or port.

The system preferably allows an operator to automatically configure the CMTS to fit the logical channel definition defined with the thresholds. This process will preferably reconfigure the settings for a receiver 2, or the selected slot and port of receiver 2 to match the logical channels defined. When the operator initiates the configuration process, the system preferably configures each of the logical channel profiles and moves each network element to the appropriate logical channel as dictated by the selected parameter and threshold settings. The primary goal of logical channel assignment is to optimize system performance as measured by each network element. System performance may include many things including: maximum through-put, maximum number of network elements supported, quality of service (QOS) performance, ease of manageability from the service provider perspective, and others. As such, the system may automatically determine the optimum value for the threshold settings or it may allow an operator to analyze his network and manually select the desired threshold settings.

In the described embodiment here the operator may trigger the logical channel configuration process. However, an alternate approach is to integrate an algorithm within the CMTS and to allow it to automatically rerun the logical channel optimization process at regular intervals (e.g. two times per day, once per day/week/month or year, etc.) in order to provide an optimal system performance while simultaneously dealing with any variations that might be encountered for some parameters over time. For example, MER and SNR parameters will vary over time because of such conditions as climate, temperature, and network degradation and maintenance.

The system preferably has the agility to manually override logical channel assignment for various modems which are configured with the automatic threshold process described above. The system preferably provides a mechanism for the operator to view the lists of modems categorized by logical channel and manually reassign them as desired prior to analyzing or configuring the channel, such as by using drag-and-drop function to minimize the efforts of the operator when undertaking any manual overrides.

The processes in FIGS. 5-6 may be implemented in hard wired devices, firmware or software running in a processor. A processing unit for a software or firmware implementation is preferably contained in the CMTS. Any of the processes illustrated in FIGS. 5-7 may be contained on a computer readable medium which may be read by microprocessor 102. A computer readable medium may be any medium capable of carrying instructions to be performed by a microprocessor, including a CD disc, DVD disc, magnetic or optical disc, tape, silicon based removable or non-removable memory, packetized or non-packetized wireline or wireless transmission signals.

The invention enables a network operator to optimize the performance of the network by assigning network elements to logical channels cheaply and quickly at a central location, such as the headened such as by using the Motorola BSR64000. The network operator may manually assign the network elements to logical channels or may use an automated process.

What is claimed is:

1. An apparatus for configuring logical channels in a network which provides communications using physical channels and logical channels comprising:
   multiple logical channel inputs from the same physical channel configurable with different operating parameters;
   a receiver configured to receive signals indicative of the network parameters from a plurality of network elements;
   a microprocessor configured to:
      identify at least one group of network elements within the plurality of network elements based on a common parametric,
      compare the common parametric to the logical channel operating parameters, and assign the at least one group of network elements to at least one of the multiple logical channels based on the comparison of parameters.

2. The apparatus of claim 1, wherein the network parameters include one of: upstream or downstream modulation error ratio (MER), upstream or downstream signal to noise ratio (SNR), upstream or downstream microreflections, upstream transmit level, downstream receive power level, cable modem type, functional capabilities, network element location with in a cable plant, network element manufacturer, or type of services provided by the network element.

3. The apparatus of claim 1, wherein the microprocessor compares the network parameters with threshold values and assigns the network elements to a logical channel based on the comparison.

4. The apparatus of claim 1, wherein the microprocessor provides instructions to the network elements to realign the network elements according to the logical channels.

5. A method for configuring logical channels in a network which provides communications using physical channels and logical channels, the method comprising:
    determining network parameters associated with a selected network element based on communications with the selected network element;
    analyzing the network parameters;
    identifying at least one group of network elements within the plurality of network elements based on a common parametric;
    identifying operating parameters corresponding to respective multiple logical channel configurable in a physical channel;
    comparing the common parametric to the logical channel operating parameters; and
    assigning the at least one group of network elements to at least one of the multiple logical channels based on the comparison of parameters.

6. The method of claim 5, wherein the network parameters include one of: upstream or downstream modulation error ratio (MER), upstream or downstream signal to noise ratio (SNR), upstream or downstream microreflections, upstream transmit level, downstream receive power level, cable modem type, functional capabilities, network element location with in a cable plant, network element manufacturer, or type of services provided by the network element.

7. The method of claim 5, wherein assigning network elements to logical channels includes comparing the network parameters with threshold values and assigning the network elements to a logical channel based on the comparison.

8. The method of claim 5, further including providing instructions to the network elements to realign the network elements according to the logical channels.

9. The method of claim 8, wherein providing instructions to the network elements to realign includes receiving instructions from an operator to realign the network elements.

10. The method of claim 5, wherein assigning network elements to a logical channel includes an operator providing selected network elements to be assigned or unassigned to or from a logical channel.

11. A non-transitory computer readable medium carrying instructions for a computer to perform a method for configuring logical channels in a network which provides communications using physical channels and logical channels comprising:
    determining network parameters associated with a selected network element based on communications with the selected network element;
    analyzing the network parameters;
    identifying at least one group of network elements within the plurality of network elements based on a common parametric;
    identifying operating parameters corresponding to respective multiple logical channel configurable in a physical channel;
    comparing the common parametric to the logical channel operating parameters; and
    assigning the at least one group of network elements to at least one of the multiple logical channels based on the comparison of parameters.

12. The non-transitory computer readable medium of claim 11, wherein the network parameters include one of: upstream or downstream modulation error ratio (MER), upstream or downstream signal to noise ratio (SNR), upstream or downstream microreflections, upstream transmit level, downstream receive power level, cable modem type, functional capabilities, network element location with in a cable plant, network element manufacturer, or type of services provided by the network element.

13. The non-transitory computer readable medium of claim 11, wherein assigning network elements to logical channels includes comparing the network parameters with threshold values and assigning the network elements to a logical channel based on the comparison.

14. The non-transitory computer readable medium of claim 11, further including providing instructions to the network elements to realign the network elements according to the logical channels.

15. The non-transitory computer readable medium of claim 14, wherein providing instructions to the network elements to realign includes receiving instructions from an operator to realign the network elements.

16. The non-transitory computer readable medium of claim 11, wherein assigning network elements to a logical channel includes an operator providing selected network elements to be assigned or unassigned to or from a logical channel.

* * * * *